(12) United States Patent
Gu

(10) Patent No.: US 10,880,823 B2
(45) Date of Patent: Dec. 29, 2020

(54) METHOD AND DEVICE METHOD AND DEVICE FOR OBTAINING ACCESS INFORMATION OF SHARED WIRELESS ACCESS POINT

(71) Applicant: SHANGHAI ZHANGXIAN NETWORK TECHNOLOGY CO., LTD., Shanghai (CN)

(72) Inventor: Zhengxiang Gu, Shanghai (CN)

(73) Assignee: SHANGHAI ZHANGXIAN NETWORK TECHNOLOGY CO., LTD., Shanghai (CN)

( * ) Notice: Subject to any disclaimer, the term of this patent is extended or adjusted under 35 U.S.C. 154(b) by 125 days.

(21) Appl. No.: 16/038,204

(22) Filed: Jul. 18, 2018

(65) Prior Publication Data

US 2018/0343609 A1    Nov. 29, 2018

Related U.S. Application Data

(63) Continuation of application No. PCT/CN2016/076946, filed on Mar. 22, 2016.

(30) Foreign Application Priority Data

Jan. 18, 2016   (CN) .......................... 2016 1 0030491

(51) Int. Cl.
*H04W 4/00* (2018.01)
*H04W 48/16* (2009.01)
(Continued)

(52) U.S. Cl.
CPC ........... *H04W 48/16* (2013.01); *H04W 48/08* (2013.01); *H04W 48/14* (2013.01); *H04W 48/20* (2013.01);
(Continued)

(58) Field of Classification Search
CPC ..................................................... H04W 48/14
See application file for complete search history.

(56) References Cited

U.S. PATENT DOCUMENTS 9,247,570 B1 *   1/2016   Gates ..................... H04W 12/08
9,258,712 B2 *   2/2016   Kiukkonen ........... H04W 12/08
(Continued)

FOREIGN PATENT DOCUMENTS

CN   103796280 A   5/2014
CN   103826291 A   5/2014
(Continued)

OTHER PUBLICATIONS

Exam Report of Indian Patent Application No. 201817026431 dated Jun. 24, 2020.

*Primary Examiner* — Guang W Li
(74) *Attorney, Agent, or Firm* — Kilpatrick Townsend & Stockton, LLP

(57) ABSTRACT

The present application is to provide a method and device for obtaining access information of a shared wireless access point. The method includes obtaining a target wireless access point use request submitted by a user by means of a user equipment, sharing mode information corresponding to the target wireless access point being applicable to a wireless connection between the user equipment and the target wireless access point, and according to the use request, sending, to the user equipment, the access information of the target wireless access point used for establishing the wireless connection.

16 Claims, 6 Drawing Sheets

(51) Int. Cl.
  *H04W 76/10* (2018.01)
  *H04W 48/08* (2009.01)
  *H04W 48/14* (2009.01)
  *H04W 48/20* (2009.01)
  *H04W 84/12* (2009.01)
  *H04W 88/08* (2009.01)

(52) U.S. Cl.
  CPC .......... *H04W 76/10* (2018.02); *H04W 84/12* (2013.01); *H04W 88/08* (2013.01)

(56) References Cited

U.S. PATENT DOCUMENTS

| | | | | |
|---|---|---|---|---|
| 2009/0094680 | A1* | 4/2009 | Gupta | H04L 63/104 726/3 |
| 2010/0020710 | A1* | 1/2010 | Gupta | H04J 11/0093 370/252 |
| 2010/0296441 | A1* | 11/2010 | Barkan | H04W 76/14 370/328 |
| 2011/0167478 | A1* | 7/2011 | Krishnaswamy | H04L 47/10 726/4 |
| 2011/0314145 | A1* | 12/2011 | Raleigh | H04W 28/021 709/224 |
| 2013/0223227 | A1* | 8/2013 | Lee | H04B 7/15557 370/236 |
| 2013/0252631 | A1* | 9/2013 | Alizadeh-Shabdiz | H04W 4/025 455/456.1 |
| 2014/0010171 | A1* | 1/2014 | Morrill | H04W 48/18 370/329 |
| 2014/0073288 | A1* | 3/2014 | Velasco | H04W 12/06 455/411 |
| 2014/0073289 | A1* | 3/2014 | Velasco | H04W 12/04031 455/411 |
| 2015/0131483 | A1* | 5/2015 | Colban | H04W 48/20 370/254 |
| 2016/0345208 | A1* | 11/2016 | Gates | G06Q 10/02 |
| 2017/0374071 | A1* | 12/2017 | Visuri | H04L 63/101 |
| 2018/0041943 | A1* | 2/2018 | Visuri | H04M 15/8351 |
| 2018/0184247 | A1* | 6/2018 | Zhang | H04L 41/0681 |
| 2020/0100302 | A1* | 3/2020 | Xu | H04W 76/10 |

FOREIGN PATENT DOCUMENTS

| | | |
|---|---|---|
| CN | 103857007 A | 6/2014 |
| CN | 104955012 A | 9/2015 |
| CN | 105050118 A | 11/2015 |
| CN | 105069669 A | 11/2015 |
| EP | 2824973 A1 | 1/2015 |

* cited by examiner

METHOD AND DEVICE METHOD AND DEVICE FOR OBTAINING ACCESS INFORMATION OF SHARED WIRELESS ACCESS POINT

CROSS-REFERENCES TO RELATED APPLICATIONS

This application is a continuation of International Application No. PCT/CN2016/076946, filed on Mar. 22, 2016, which claims priority to Chinese Patent Application No. 201610030491.3, filed on Jan. 18, 2016. The disclosures of the aforementioned applications are hereby incorporated by reference in their entireties.

FIELD OF THE INVENTION

The present application relates to the field of computers, and in particular to a technique of obtaining access information of a shared wireless access point.

BACKGROUND OF THE INVENTION

In the prior art, when a user equipment is to access a wireless network, for example, when the user equipment is to be connected to a WiFi (wireless fidelity) network, a corresponding connection password is usually required for an encrypted wireless access point. In practical applications, open wireless access points, such as most of the public wireless access points, usually have a lower signal strength, stability and security than that of general encrypted wireless access points; however, if a demand user does not know the connection password of the encrypted wireless access point, the wireless network corresponding to the wireless access point may not be accessed. For example, when the demand user and the owner of the encrypted wireless access point do not know each other, there is a low probability to obtain the connection password of the encrypted wireless access point, and therefore, the wireless network corresponding to the wireless access point may not be accessed. Therefore, the user's networking success rate is low, and the networking requirements are not satisfied.

BRIEF SUMMARY OF THE INVENTION

The present application is to provide a method and device for obtaining access information of a shared wireless access point.

According to one embodiment of the present application, a method for obtaining access information of a shared wireless access point at a network device end is provided. The method includes obtaining a use request for a target wireless access point submitted by a user by means of a user equipment, and sharing mode information corresponding to the target wireless access point being applicable to a wireless connection between the user equipment and the target wireless access point, and sending, based on the use request, access information of the target wireless access point, which is used for establishing the wireless connection, to the user equipment.

According to another embodiment of the present application, a device for obtaining access information of a shared wireless access point at a user equipment end is further provided. The device includes operations for sending, to a corresponding network device, a use request for a target wireless access point submitted by a user, and sharing mode information corresponding to the target wireless access point being applicable to a wireless connection between the user equipment and the target wireless access point, and obtaining access information of the target wireless access point, which is used for establishing the wireless connection and returned by the network device.

According to still another embodiment of the present application, a network device for obtaining access information of a shared wireless access point is further provided. The network device includes a first means for obtaining a use request for a target wireless access point submitted by a user by means of a user equipment, and sharing mode information corresponding to the target wireless access point being applicable to a wireless connection between the user equipment and the target wireless access point, and a second means for sending, based on the use request, access information of the target wireless access point, which is used for establishing the wireless connection, to the user equipment.

According to yet another embodiment of the present application, a user equipment for obtaining access information of a shared wireless access point is further provided, comprising:

ninth means for sending, to a corresponding network device, a use request for a target wireless access point submitted by a user, and sharing mode information corresponding to the target wireless access point being applicable to a wireless connection between the user equipment and the target wireless access point, and a tenth means for obtaining access information of the target wireless access point, which is used for establishing the wireless connection and returned by the network device.

According to another embodiment of the present application, a system for obtaining access information of a shared wireless access point is further provided, and the system comprises: a network device for obtaining access information of a shared wireless access point provided according to still another embodiment of the present application, and a user equipment for obtaining access information of a shared wireless access point provided according to yet another embodiment of the present application.

A network device of the present application sends, based on an obtained use request for a target wireless access point submitted by a user by means of a user equipment, access information, which is used for establishing the target wireless access point, to the user equipment. Here, the network device stores massive shared wireless access points and their corresponding access information, and based on a target wireless access point corresponding to a use request, matching access information required by a user equipment to connect the target wireless access point can be returned to the user equipment, and the user equipment will achieve a corresponding wireless connection based on the sharing mode information corresponding to the target wireless access point. Therefore, the user equipment can reduce the probability of no available network by means of mass storage of the wireless access point in the network device, and meanwhile, the effective utilization of information resources corresponding to a shared wireless access point is improved as a whole, so that when a user sends a use request for a target wireless access point, sharing mode information corresponding to the target wireless access point is accepted and the sharing mode information satisfies use requirements and use preferences of different users by means of effective classification of the wireless access points massively stored in the network device, thereby enriching the user's selection types and optimizing the user experience.

Further, the network device returns one or more matching wireless access point related information to the user equipment based on the acquisition request for wireless access point(s) submitted by the user equipment, which comprises returning matching sharing mode information of the wireless access point. Here, the network device accurately locks a requirement range of the user equipment based on the acquisition request in conjunction with big data operational analysis of the network device, so that while the user needs are satisfied, the selection time-consuming of the user equipment is reduced and the data transmission amount among devices is reduced, and at the same time, the user's usage expectations can be better satisfied and the user's networking experience can be optimized.

Further, when the network device stores multiple versions of wireless access point related information of the same wireless access point, a version of wireless access point related information with the highest connection success rate can be selected for the user based on a priority determination rule, so that the user's usage expectations can be better satisfied and the user's networking experience can be optimized.

Further, the network device can also firstly send, if the sharing mode information indicates a payment sharing mode, corresponding payment mode related information to the corresponding user equipment based on the obtained use request, and then sends, after the corresponding payment selection information returned by the user equipment, access information of the target wireless access point. Here, the payment mode related information will give the user equipment a more flexible and diverse selection range, which can make it convenient for the users to select a specific matching payment mode based on their actual networking requirements, thereby optimizing the user experience. At the same time, by means of the diversified payment modes, the providers of the target wireless access point are encouraged to share their own wireless access point as a whole, thereby enriching the users' selectable shared wireless access points and more efficiently satisfying the user's networking requirements.

Further, the network device 1 obtains update information for the wireless access point related information, and the update information comprises update information for the access information of the wireless access point, and/or update information for the charging mode information of the wireless access point, and updates, based on the update information for the wireless access point, the stored wireless access point related information or matches update marks Here, multiple update modes can be flexibly selected based on the impact and demand of data update on the overall running efficiency, for example, updating specific data, such as access information, or/and charging mode information of the stored wireless access point based on the update information for the wireless access point related information; and for another example, setting an update mark first, and then carrying out an oriented data update in combination with an indication of the update mark based on the subsequent requirements, such as based on the use request of the user equipment. Therefore, the resource consumption of data transmission and data storage in the network device 1 can be reduced as a whole while ensuring the validity of the wireless access point related information obtained by the user equipment.

Additionally, in the present application, the user equipment implements the acquisition of access information of the shared wireless access point more efficiently in cooperation with the network device by sending the use request, the acquisition request, the payment selection information, etc. to the network device and obtaining corresponding data information returned by the network device.

BRIEF DESCRIPTION OF THE DRAWINGS

By reading the following detailed description made with reference to the drawings for non-limiting embodiments, the other features of the present application will become more apparent.

Figure 1:
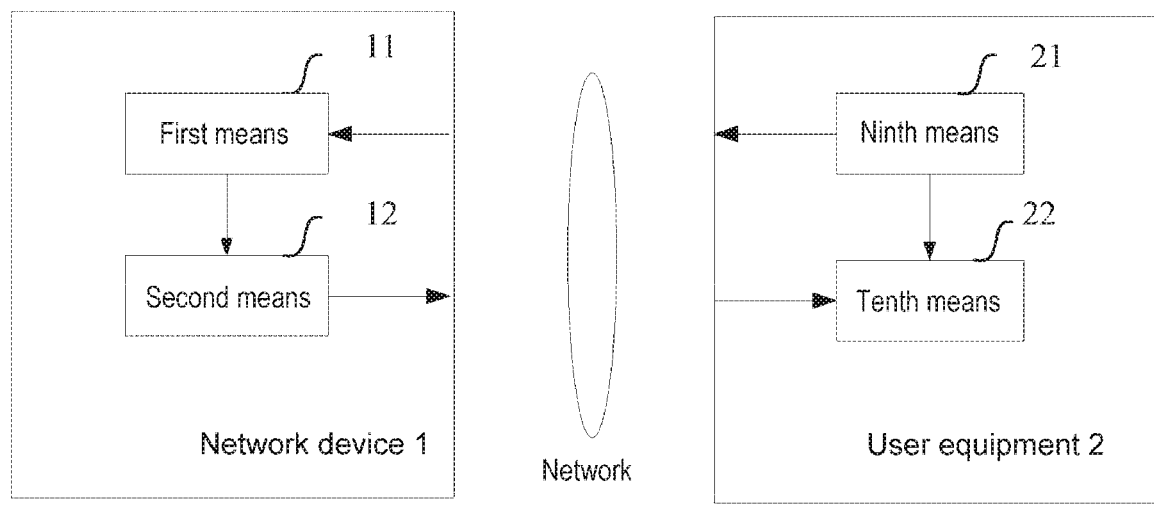
FIG. 1 shows a schematic diagram of a system of a network device and a user equipment for obtaining access information of a shared wireless access point according to one embodiment of the present application.

In the drawings, the same or similar reference signs represent the same or similar components.

DETAILED DESCRIPTION OF THE INVENTION

The present application is hereinafter further described in detail in conjunction with the accompanying drawings.

In a typical configuration of the present application, a terminal, a device of a service network and a trustable party all include one or more processors (CPUs), an input/output interface, a network interface and a memory.

The memory may include a non-permanent memory, a random access memory (RAM) and/or a non-volatile memory (such as a read-only memory (ROM) or a flash memory (flash RAM)) and so on in a computer-readable medium. A memory is an example of a computer-readable medium.

A computer-readable medium comprises permanent and non-permanent, movable and non-movable media and may realize information storage by means of any method or technology. The information may be a computer-readable instruction, a data structure, a program module or other data. The examples of a computer storage medium include but are not limited to a phase change memory (PRAM), a static random access memory (SRAM), a dynamic random access memory (DRAM), other types of random access memories (RAMs), a read-only memory (ROM), an electrically erasable programmable read-only memory (EEPROM), a flash memory or other memory technologies, compact disk read-only memory (CD-ROM), a digital versatile disc (DVD) or other optical storages, a magnetic cassette tape, and magnetic tape and magnetic disk storage or other magnetic storage devices or any other non-transmission media, which can be used to store information that can be accessed by a computing device. According to the definition herein, the computer-readable medium does not include a non-transitory computer-readable medium, such as a modulated data signal and carrier.

FIG. 1 shows a schematic diagram of a system of a network device 1 and a user equipment 2 for obtaining access information of a shared wireless access point according to one embodiment of the present application. The network device 1 comprises first means 11 and second means 12, and the user equipment 22 comprises ninth means 21 and tenth means 22.

Here, the network device 1 includes, but is not limited to, a computer, a network host, a single network server, and a cloud composed of network server sets or servers; here, the cloud is composed of a large number of cloud computing-based computers or network servers, and cloud computing is a type of distributed computing, and is a virtual supercomputer consisting of a group of loosely coupled computers. The user equipment 2 comprises various smart terminals, such as mobile smart devices and various personal computers. Here, it should understand that the above-mentioned network device 1 and a user equipment 2 are merely exemplary, and the other existing or the network device 1 and user equipment 2 that may appear in the future should also be included in the scope of protection of the present application as applicable to the present application and are hereby incorporated by reference. Here, a wireless access point is an access point corresponding to a wireless network, and the wireless network includes, but not limited to, a wireless local area network based on IEEE 802.11 series standard protocol, for example, a wireless local area network based on IEEE 802.11b protocol, namely, a so-called WiFi network. The user equipment connects a corresponding wireless network via a wireless access point.

In one embodiment, the ninth means 21 of the user equipment 2 sends, to a corresponding network device 1, a use request for a target wireless access point submitted by a user and the use request is obtained by the first means 11 of the corresponding network device 1, and sharing mode information corresponding to the target wireless access point is applicable to a wireless connection between the user equipment 2 and the target wireless access point. Here, the network device 1 stores massive shared wireless access points provided by various provision devices, mobile operators, etc. The user may submit, by means of the user equipment, a use request for access information corresponding to the target wireless access point expected to be obtained from the network device 1. Here, the user can send the use request by manually inputting identification information of the target wireless access point, for example, SSID (Service Set Identifier) information of the wireless access point, etc., or selecting the target wireless access point from a wireless access point list provided on the user equipment 2. Here, when the target wireless access point is stored in the network device 1, it is matched with corresponding sharing mode information, and the sharing mode information may include a free sharing mode, a payment sharing mode, etc. When the user equipment 2 submits the use request, it simultaneously accepts to achieve a wireless connection between the user equipment and the target wireless access point based on the sharing mode information corresponding to the target wireless access point.

Then, the second means 12 of the network device 1 sends, based on the use request, access information of the target wireless access point, which is used for establishing the wireless connection, to the user equipment 2, and correspondingly, the access information is obtained by the tenth means 22 of the user equipment 2. Here, in one embodiment, it may be preferable that in combination with the sharing mode information of the target wireless access point, if so, the requested target wireless access point corresponds to a free sharing mode, and then the access information of the corresponding target wireless access point can be directly sent to the user equipment 2; if so, the requested target wireless access point corresponds to a payment sharing mode and the use request already contains specific payment selection information, the access information of the corresponding target wireless access point may also be directly sent to the user equipment 2; if so, the requested target wireless access point corresponds to a payment sharing mode and the use request does not contain specific payment selection information, the network device 1 can directly send the access information to the user equipment 2 and perform charging based on a pre-set default charging mode; in addition, the network device 1 may also determine and return the corresponding payment mode related information to the corresponding user equipment 2 based on the target wireless access point, and then send the access information to the user equipment 2 based on the payment selection information sent by the user equipment 2.

Here, the network device 1 of the present application sends, based on the obtained use request for the target wireless access point submitted by a user by means of the user equipment 2, access information, which is used for establishing the target wireless access point, to the user equipment 2. Here, the network device 1 stores massive shared wireless access points and their corresponding access information, and based on a target wireless access point corresponding to a use request, matching access information required by a user equipment to connect the target wireless access point can be returned to the user equipment 2, and the user equipment 2 will achieve a corresponding wireless connection based on the sharing mode information corresponding to the target wireless access point. Therefore, the user equipment 2 can reduce the probability of no available network by means of mass storage of the wireless access point in the network device 1, and meanwhile, the effective utilization of information resources corresponding to a shared wireless access point is improved as a whole, so that when a user sends a use request for a target wireless access point, sharing mode information corresponding to the target wireless access point is accepted, and the sharing mode information satisfies use requirements and use preferences of different users by means of effective classification of the wireless access points massively stored in the network device 1, thereby enriching the user's selection types and optimizing the user experience. Here, the user equipment 2 implements the acquisition of access information of the shared wireless access point more efficiently in cooperation with the network device 1 by sending the use request to the network device 1 and obtaining corresponding data information returned by the network device 1.

Figure 2:
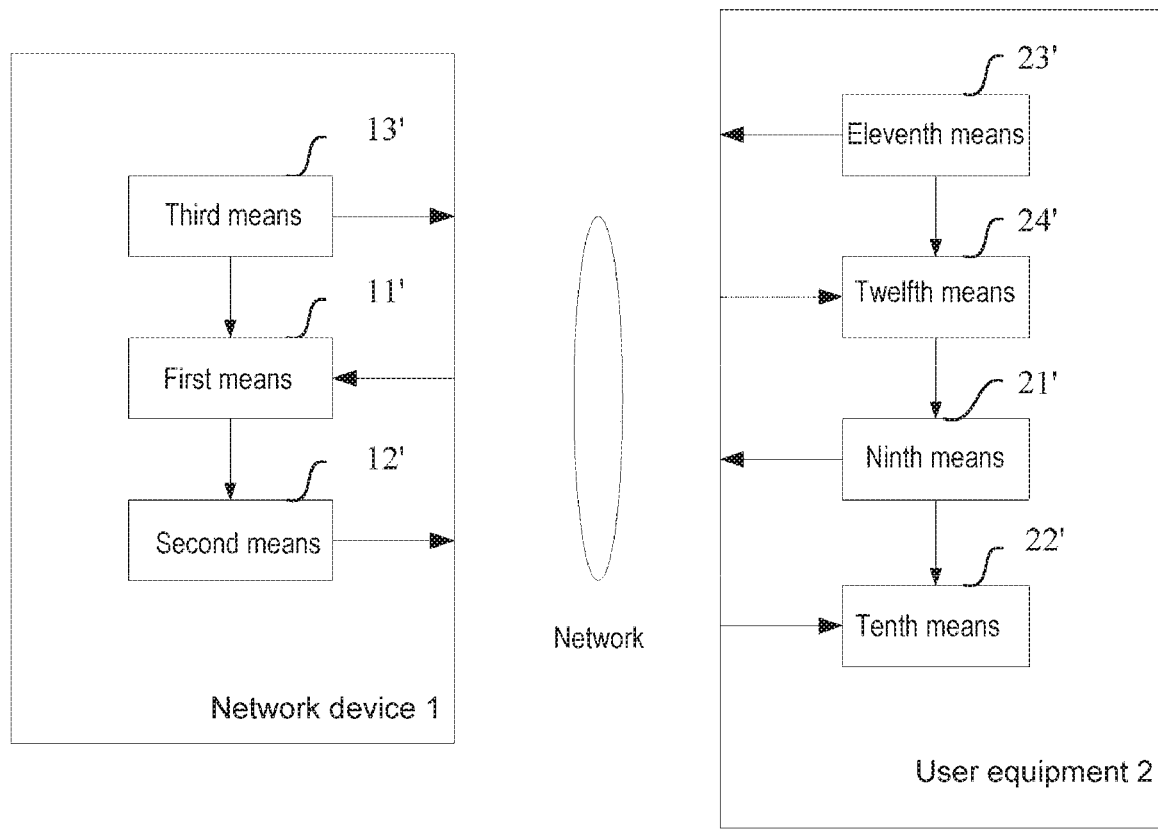
FIG. 2 shows a schematic diagram of a system of a network device and a user equipment for obtaining access information of a shared wireless access point according to one embodiment of the present application.

FIG. 2 shows a schematic diagram of a system of a network device 1 and a user equipment 2 for obtaining access information of a shared wireless access point according to one embodiment of the present application. The network device 1 comprises third means 13', first means 11' and second means 12', and the user equipment 2 comprises eleventh means 23', twelfth means 24', ninth means 21' and tenth means 22'. Here, the contents of the first means 11', the second means 12', the third means 21' and the tenth means 22' are correspondingly the same as or substantially the same as those of the first means 11, the second means 12, the ninth means 21 and the tenth means 22 shown in FIG. 1, which will not be described in detail herein and are hereby incorporated by reference.

In the present application, access point related information of a wireless access point stored in the network device 1 may include one or more of various types of information associated with the wireless access point, for example, the information may include access information of the wireless access point, and the access information comprises verification information for connecting a corresponding wireless access point, for example, a character string and an encrypted character string including connection password information, or description file information including the connection password information; for another example, the information may include SSID (Service Set Identifier) information of the wireless access point, MAC (Media Access Control) information of the wireless access point device, and geographical position information of the wireless access point, for example, latitude and longitude information corresponding to the wireless access point obtained based on GPS (Global Positioning System); for another example, the information may include POI (Point of Interest) information of the wireless access point, such as information of merchants around the wireless access point; for another example, the information may include signal security information, signal strength information, recommended application type information of the wireless access point, etc.; for another example, the information may include sharing mode information of the wireless access point; and for another example, in a payment mode, the information may also include charging mode information. Here, it should understand that the above-mentioned various wireless access point related information are merely exemplary, and the other existing or other types of wireless access point related information that may appear in the future should also be included in the scope of protection of the present application as applicable to the present application and are hereby incorporated by reference.

In one embodiment, the eleventh means 23' of the user equipment 2 sends, to the network device 1, an acquisition request for wireless access point(s) submitted by the user by means of the user equipment 2. Correspondingly, the third means 13' of the network device 1 sends one or more matching wireless access point related information to the user equipment 2 based on the acquisition request for wireless access point(s) submitted by the user by means of the user equipment 2, and the wireless access point related information comprises sharing mode information corresponding to the wireless access point(s). Correspondingly, the twelfth means 24' receives one or more wireless access point related information matching the acquisition request and returned by the network device 1.

Here, there may be multiple possible scenarios where the user equipment 2 submits the acquisition request. For example, the user equipment 2 may send its own geographical position information, such as GPS information, to the network device 1, and then the network device 1 determines one or more wireless access points matching the geographical position information and sends wireless access point related information corresponding to the wireless access point to the user equipment 2. For another example, the user equipment 2 obtains one or more wireless access points around it by means of wireless scanning and sends the acquisition request according to this, so that the network equipment 1 is expected to return the one or more wireless access point related information matching the wireless access points.

Here, it should understand that the above-mentioned various scenarios where the user equipment 2 submits the acquisition request are merely exemplary, and the other existing or other application scenarios that may appear in the future should also be included in the scope of protection of the present application as applicable to the present application and are hereby incorporated by reference.

Then, the ninth means 21' sends, to the network device 1, a use request for a target wireless access point submitted by the user, and the sharing mode information corresponding to the target wireless access point is applicable to a wireless connection between the user equipment 2 and the target wireless access point, and the target wireless access point is selected and determined by the user from the one or more wireless access point related information. And correspondingly, the target wireless access point is obtained and received by the first means 11' of the network device 1. Here, the user can refer to the one or more wireless access point related information returned by the network device 1 to determine a target wireless access point complying with the requirements, so as to firstly submit the corresponding use request to the network device 1.

In this embodiment, the network device 1 returns one or more matching wireless access point related information to the user equipment 2 based on the acquisition request for wireless access point(s) submitted by the user equipment 2, which comprises returning matching sharing mode information of the wireless access point. Here, the network device 1 accurately locks a requirement range of the user equipment 2 based on the acquisition request in conjunction with big data operational analysis of the network device 1 to match one or more suitable wireless access point related information for same, so that while the user needs are satisfied, the selection time-consuming of the user equipment 2 is reduced and the data transmission amount among devices is reduced, and at the same time, the user's usage expectations can be better satisfied and the user's networking experience can be optimized.

In one embodiment, the third means 13' comprises a first unit (not shown) and a second unit (not shown). The first unit determines one or more matching wireless access point related information based on an acquisition request for wireless access point(s) submitted by a user by means of a user equipment 2, and the wireless access point related information is determined based on a priority determination rule; and the second unit sends the one or more wireless access point related information to the user equipment 2, and the wireless access point related information comprises sharing mode information corresponding to the wireless access point(s).

In one embodiment, the wireless access point stored in the network device 1 sometimes may correspond to multiple versions of wireless access point related information. For example, it may be the same wireless access point shared by different provision devices, for example, the provision device can be a device corresponding to an owner of the wireless access point, that is, the owner of the wireless access point; and it may be a device used by other people who know the wireless access point related information but do not have an ownership. For another example, the same wireless access point may be shared by the same provision device multiple times. In this scenario, the corresponding version of wireless access point related information most matching the acquisition request (for example, preferentially matching the wireless access point related information, with the highest priority level, corresponding to the same wireless access point) may be determined and provided to the user equipment 2 based on the pre-set priority determination rule.

Here, it may be preferable that the priority determination rule for the multiple versions of access point related information is that the wireless access point related information provided by a provision device with ownership has a priority over the wireless access point related information of the same wireless access point provided by a provision device without ownership; and with regard to multiple provision devices with ownership, wireless access point related information which is temporally subsequent stored is prioritized. Here, the provision device without ownership may be any device that does not have an ownership but knows the wireless access point related information.

Here, when the user equipment 2 desires to obtain wireless access point related information of a target wireless access point stored in the network device 1, a version of wireless access point related information with a higher priority can be matched for the demand device based on the priority determination rule, in order to increase the success rate of the demand device connecting the wireless access point, because in general, the owner of the wireless access point has a right to change the wireless access point related information, the probability that the wireless access point related information provided thereby is valid is higher; and for the wireless access point related information provided by the provision device with the same ownership, the time approximately closes to the present, and the validity of the information is relatively high; and if multiple provision devices with ownership provide the wireless access point related information, it is also preferable to give priority to the temporally subsequent stored information.

In this embodiment, when the network device 1 stores multiple versions of wireless access point related information of the same wireless access point, a version of wireless access point related information with the highest connection success rate can be selected for the user based on the priority determination rule, so that the user's usage expectations can be better satisfied and the user's networking experience can be optimized.

In one embodiment, the third means 13' of the network device 1 comprises a third unit (not shown) and a fourth unit (not shown), and the twelfth means 24' of the user equipment 2 comprises an eighth unit (not shown). In one embodiment, the third unit obtains an acquisition request for wireless access point(s) submitted by a user by means of the user equipment 2, and the acquisition request comprises a sharing mode condition; and then, the fourth unit sends the one or more wireless access point related information of which the sharing mode information match the sharing mode condition to the user equipment 2 and the eighth unit receives the returned one or more wireless access point related information. Here, when the user equipment 2 submits the acquisition request, that is, simultaneously comprising a sharing mode condition, for example, a payment mode or a free mode, the network device 1 will directly determine the wireless access point related information that meets the sharing mode condition, for example, a user desires to use a free wireless access point, or a user desires to use a payment wireless access point with a higher safety factor. Therefore, based on the sharing mode condition of the user equipment 2, the resource consumption of data query and data transmission in the network device 1 can be reduced, and at the same time, direct user requirements of the user can be more efficiently satisfied, and the user experience can be optimized.

Figure 3:
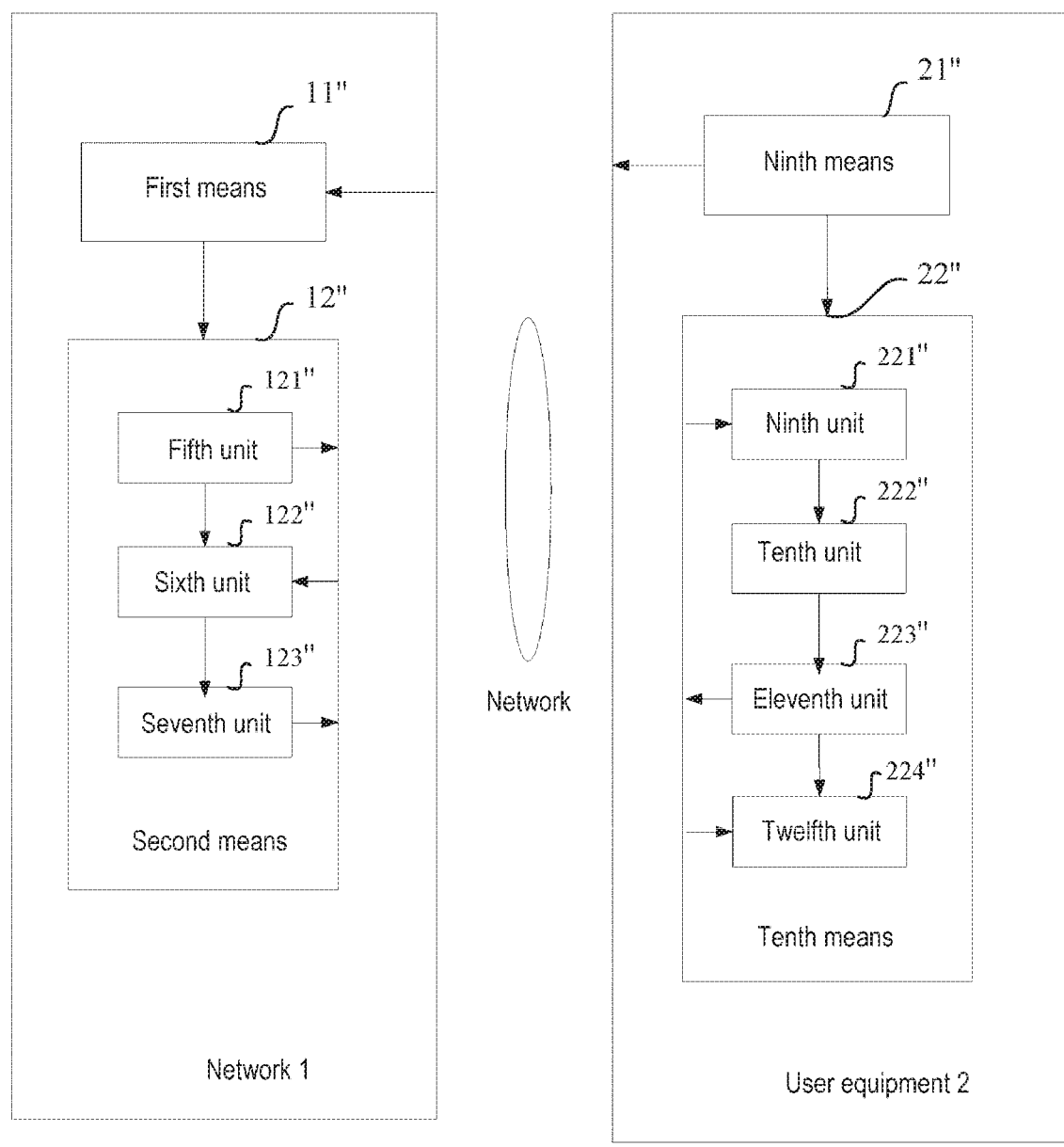
FIG. 3 shows a schematic diagram of a system of a network device and a user equipment for obtaining access information of a shared wireless access point according to another embodiment of the present application.

FIG. 3 shows a schematic diagram of a system of a network device 1 and a user equipment 2 for obtaining access information of a shared wireless access point according to another embodiment of the present application. The network device 1 comprises first means 11" and second means 12", and the user equipment 2 comprises ninth means 21" and tenth means 22", and the second means 12" further comprises a fifth unit 121", a sixth unit 122" and a seventh unit 123", and the tenth unit 22" further comprises a ninth unit 221", a tenth unit 222", an eleventh unit 223", and a twelfth unit 224".

In one embodiment, the ninth means 21" of the user equipment 2 sends, to the corresponding network device 1, a use request for a target wireless access point submitted by a user and the use request is obtained by the first means 11" of the corresponding network device 1, and sharing mode information corresponding to the target wireless access point is applicable to a wireless connection between the user equipment 2 and the target wireless access point; then the fifth unit 121" sends, based on the use request, when the sharing mode information of the target wireless access point indicates a payment sharing mode, payment mode related information corresponding to the target wireless access point to the user equipment 2; correspondingly, the ninth unit 221" of the user equipment 2 receives the payment mode related information; then the tenth unit 222" determines corresponding payment selection information based on the payment mode related information; furthermore, the eleventh unit 223" sends the payment selection information to the network device 1; correspondingly, the sixth unit 122" of the network device 1 obtains the payment selection information sent by the user equipment 2 and based on the payment mode related information; and the seventh unit 123" sends access information of the target wireless access point to the user equipment 2 based on the payment selection information. Here, the contents of the ninth means 21' and the first means 11' are correspondingly the same as or substantially the same as those of the ninth means 21' and the first means 11 shown in FIG. 1, which will not be described in detail herein and are hereby incorporated by reference. In this embodiment, for the payment sharing mode, and when the use request does not contain the user's corresponding payment selection information, the user equipment being connected to the target wireless access point requires the user to firstly select a corresponding payment mode, that is, the payment selection information corresponding to the payment mode related information, and then the network device returns the corresponding access information.

Here, it may be preferable that the payment mode related information comprises charging mode information of the target wireless access point, and the charging mode information may be flexibly selected, combined and set according to the standards such as a connection duration and the number of times of connections of the wireless access point. The charging mode information may be set by a wireless access point provider or the network device 1 when the wireless access point is shared, and the payment mode information may be information of the current wireless access point. Further, the payment mode related information further comprises historical charging information of the target access point. Here, the network device 1 may perform statistical analysis on the historical charging information within a pre-set period of time and provide the statistical analysis result as historical charging information to the user equipment 2, so that the user equipment can better determine and select a target wireless access point and submit corresponding payment selection information.

In this embodiment, the network device 1 can also firstly send, if the sharing mode information indicates a payment sharing mode, corresponding payment mode related information to the corresponding user equipment 2 based on the obtained user request, and then sends, after the corresponding payment selection information returned by the user equipment 2, access information of the target wireless access point. Here, the payment mode related information will give the user equipment 2 a more flexible and diverse selection range, which can make it convenient for the users to select a specific matching payment mode based on their actual networking requirements, thereby optimizing the user experience. At the same time, by means of the diversified payment modes, the providers of the target wireless access point are encouraged to share their own wireless access point as a whole, thereby enriching the users' selectable shared wireless access points and more efficiently satisfying the user's networking requirements.

In one embodiment (see FIG. 1), the network device 1 further comprises fourth means (not shown) and fifth means (not shown). The fourth means obtains update information for the wireless access point related information of the target wireless access point, and the update information comprises update information for access information of the target wireless access point, and/or update information for the charging mode information of the target wireless access point; and the fifth means updates, based on the update information, the wireless access point related information of the target wireless access point in the network device 1 or matches update marks.

In one embodiment, the update information herein may comprise the updated specific data of the access point related information, or may also be merely change prompt information indicating that the wireless access point related information is updated. Here, it may be preferable that the update information may be obtained by the network device 1 from the provision device of the shared wireless access point. In addition, it can also be that the update information is firstly provided by the provision device to be stored to a third-party temporary database, a data cache means, etc., and then is obtained by the network device from the temporary database and data cache means. Here, the following several application scenarios can be included In one embodiment: it can be that the fourth means periodically obtains the update information, and the update information comprises the updated specific data of the wireless access point related information, so that the fifth means performs data update on the stored wireless access point related information based on the update information; it can also be that the fourth means obtains the update information in real time, and the update information comprises the updated specific data of the wireless access point related information, so that the fifth means performs data update on the stored wireless access point related information based on the update information; it can also be that the fourth mean obtains the update information in real time, and the update information corresponds to change prompt information indicating that the wireless access point related information is updated, so that the fifth means only matches, based on the update information, the stored wireless access point related information with update marks, and in this scenario, when the user requests the wireless access point related information, the actually updated specific data is found in the provision device or the temporary database and the data cache means again based on the heading of the update marks, such that the resource consumption of data transmission and data storage in the network device 1 can be reduced as a whole while ensuring the validity of the wireless access point related information obtained by the demand user users. Here, it should understand that the above-mentioned various application scenarios of this embodiment are merely exemplary, and the other existing or other various application scenarios that may appear in the future should also be included in the scope of protection of the present application as applicable to the present application and are hereby incorporated by reference.

Here, the wireless access point related information comprises one or both of the access information and the charging mode information. And the update information matches the provision device, such as matching the provision device identification information. Here, it should understand that the above-mentioned access information and charging mode information are merely exemplary, and the other existing or other various types of wireless access point related information that may appear in the future should also be included in the scope of protection of the present application as applicable to the present application and are hereby incorporated by reference.

In this embodiment, the network device 11 obtains update information for the wireless access point related information, and the update information comprises update information for the access information of the wireless access point, and/or update information for the charging mode information of the wireless access point, and updates, based on the update information for the wireless access point, the stored wireless access point related information or matches update marks. Here, multiple update modes can be flexibly selected based on the impact and demand of data update on the overall running efficiency, for example, updating specific data, such as access information, or/and charging mode information of the stored wireless access point based on the update information for the wireless access point related information; and for another example, setting an update mark first, and then performing an oriented data update based on the subsequent requirements, such as based on the use request from the user equipment 2, in conjunction with an indication of the update mark. Therefore, the resource consumption of data transmission and data storage in the network device 11 can be reduced as a whole while ensuring the validity of the wireless access point related information obtained by the user equipment 2.

In one embodiment, the network device 1 further comprises sixth means (not shown), and the sixth means determines, based on the use request for the target wireless access point of the user equipment 2, current charging mode information of the target wireless access point based on an update mark with the charging mode information if the target wireless access point corresponds to the update mark, and the current charging mode information is to be sent to the user equipment 2 corresponding to the use request. Here, in order to reduce the consumption of time and storage resources caused by data update in the network device, an update mark can be made to the charging mode information that sends changes in place of the network device to update the stored charging mode information in real time, so that when the use request from the user equipment 2 arrives, the status of the locally stored charging mode information is first queried, if there is no corresponding update mark, the locally stored charging mode information in the network device 1 is presumptive current charging mode information, and if the locally stored charging mode information corresponds to an update mark, the updated actual data information is read, based on the indication of the update mark, from the provision device updating a source or other temporary databases or third party databases to serve as the current charging mode information and is sent to the user equipment 2.

In one embodiment, the network device 1 further comprises seventh means (not shown), and the user equipment 2 further comprises thirteenth means (not shown), fourteenth means (not shown) and fifteenth means (not shown).

The thirteenth means of the user equipment 2 establishes a wireless connection between the user equipment 2 and the target wireless access point based on access information of the target wireless access point; at the same time, the network device 1 obtains the update information for the charging mode information of the target wireless access point, and the seventh means sends prompt information to the user equipment 2 based on the update information for the charging mode information; and the fourteenth means of the user equipment 2 obtains the prompt information, so that the fifteenth means of the user equipment 2 reconfirms, based on the prompt information, the target wireless access point to be connected. Here, when the provision device changes the charging mode information, the network device generates corresponding prompt information based on the update information, and the prompt information may comprise the change of the charging mode information of the target wireless access point that the user equipment 2 is using, and if the charging fee becomes higher, other applicable alternative wireless access point related information may also be recommended to the user for sending, so that the user equipment 2 can reasonably adjust its own connection strategy based on the prompt information. For example, the target wireless access point, is changed or the usage duration is adjusted, etc. Therefore, the user experience is optimized.

In one embodiment, the device further comprises eighth means (not shown), and the eighth means sends, based on the use request, when the sharing mode information of the target wireless access point indicates a payment sharing mode, payment prompt information to the user equipment 2 in conjunction with the charging mode information of the target wireless access point and use-related information of the target wireless access point by the user equipment 2. Here, the use-related information may be from the payment selection information determined by the user equipment 2 based on the charging mode information, such as a pre-selected connection duration, the number of times of connections, etc., and may also be from the actual use of the target wireless access point by the user, that is, the real-time statistical use. Here, the use-related information may be captured by the network device 1 directly from the user equipment 2, and may also be sent by the user equipment 2 to the network device 1 based on settings, such as periodically. Here, the payment prompt information sent to the user equipment 2 may be sent at any time before, during, or after the user actually uses the target wireless access point.

Figure 4:
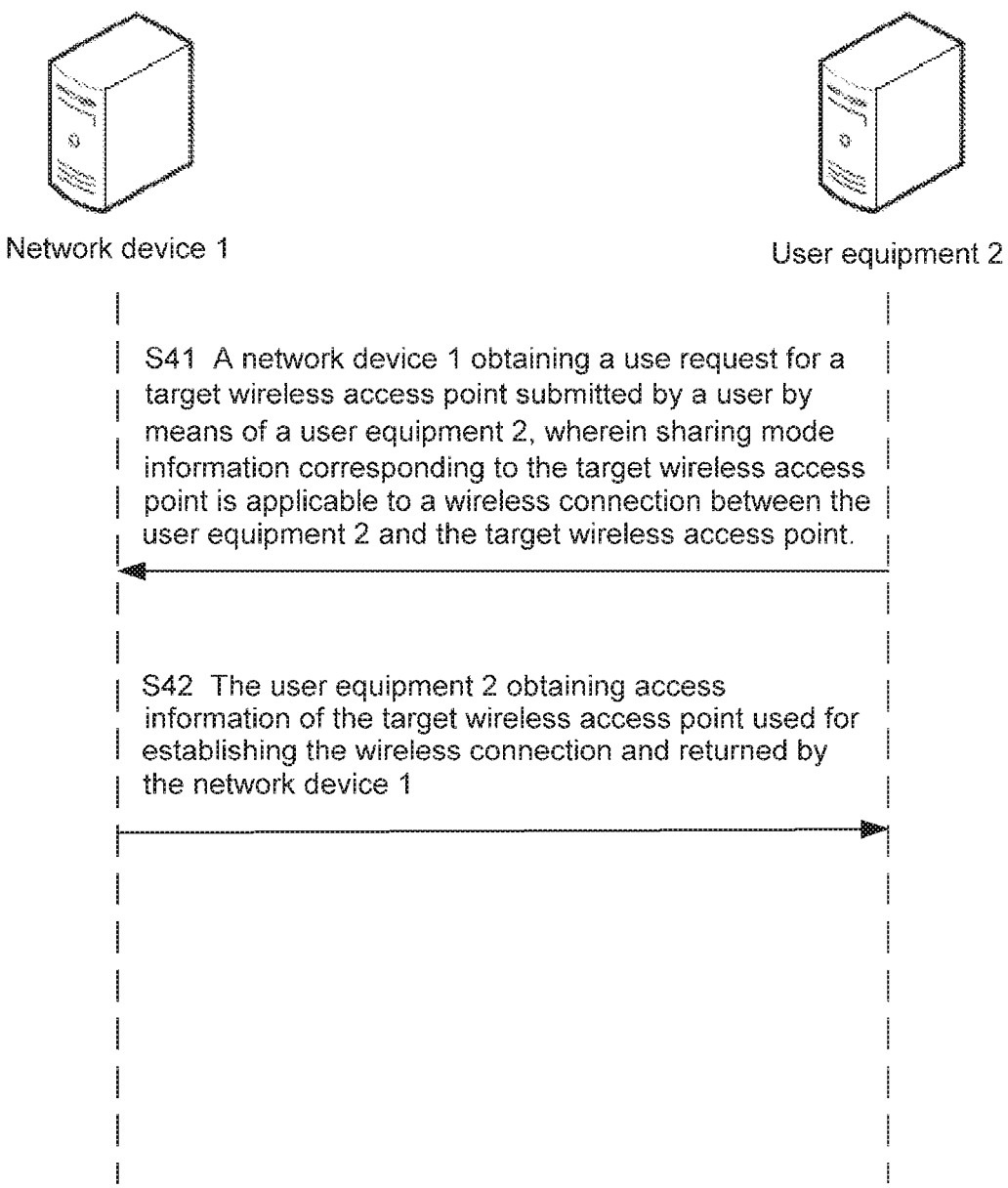
FIG. 4 shows a flowchart of a method for sharing a wireless access point at a network device end and a user equipment end according to another embodiment of the present application.

FIG. 4 shows a flowchart of a method for sharing a wireless access point at a network device end and a user equipment end according to another embodiment of the present application. The method comprises steps S41 and S42.

Here, the network device 1 includes, but is not limited to, a computer, a network host, a single network server, and a cloud composed of network server sets or servers; here, the cloud is composed of a large number of cloud computing-based computers or network servers, and cloud computing is a type of distributed computing, and is a virtual supercomputer consisting of a group of loosely coupled computers. The user equipment 2 comprises various smart terminals, such as mobile smart devices and various personal computers. Here, it should understand that the above-mentioned network device 1 and user equipment 2 are merely exemplary, and the other existing or the network device 1 and user equipment 2 that may appear in the future should also be included in the scope of protection of the present application as applicable to the present application and are hereby incorporated by reference. Here, a wireless access point is an access point corresponding to a wireless network, and the wireless network includes, but not limited to, a wireless local area network based on IEEE 802.11 series standard protocol, for example, a wireless local area network based on IEEE 802.11b protocol, namely, a so-called WiFi network. The user equipment connects a corresponding wireless network via a wireless access point.

In one embodiment, in step S41, the network device 1 obtains a use request for a target wireless access point submitted by a user by means of a user equipment 2, and sharing mode information corresponding to the target wireless access point is applicable to a wireless connection between the user equipment 2 and the target wireless access point. Here, the network device 1 stores massive shared wireless access points provided by various provision devices, mobile operators, etc. The user may submit, by means of the user equipment, a use request for access information corresponding to the target wireless access point expected to be obtained from the network device 1. Here, the user can send the use request by manually inputting identification information of the target wireless access point, for example, SSID (Service Set Identifier) information of the wireless access point, etc., or selecting the target wireless access point from a wireless access point list provided on the user equipment 2. Here, when the target wireless access point is stored in the network device 1, it is matched with corresponding sharing mode information, and the sharing mode information may include a free sharing mode, a payment sharing mode, etc. When the user equipment 2 submits the use request, it simultaneously accepts to achieve a wireless connection between the user equipment and the target wireless access point based on the sharing mode information corresponding to the target wireless access point.

Then, in step S42, the user equipment 2 sends, based on the use request, access information of the target wireless access point, which is used for establishing the wireless connection, to the user equipment 2. Here, it may be preferable that in conjunction with the sharing mode information of the target wireless access point, if so, the requested target wireless access point corresponds to a free sharing mode, and then the corresponding access information of the target wireless access point can be directly sent to the user equipment 2; if so, the requested target wireless access point corresponds to a payment sharing mode and the use request already contains specific payment selection information, the corresponding access information of the target wireless access point may also be directly sent to the user equipment 2; if so, the requested target wireless access point corresponds to a payment sharing mode and the use request does not contain specific payment selection information, the network device 1 can directly send the access information to the user equipment 2 and perform charging based on a pre-set default charging mode; in addition, the network device 1 may also determine and return the corresponding payment mode related information to the corresponding user equipment 2 based on the target wireless access point, and then send the access information to the user equipment based on the payment selection information sent by the user equipment 2.

Here, the network device 1 of the present application sends, based on the obtained use request for the target wireless access point submitted by a user by means of the user equipment 2, access information, which is used for establishing the target wireless access point, to the user equipment 2. Here, the network device 1 stores massive shared wireless access points and their corresponding access information, and based on a target wireless access point corresponding to a use request, matching access information required by a user equipment to connect the target wireless access point can be returned to the user equipment 2, and the user equipment 2 will achieve a corresponding wireless connection based on the sharing mode information corresponding to the target wireless access point. Therefore, the user equipment 2 can reduce the probability of no available network by means of mass storage of the wireless access point in the network device 1, and meanwhile, the effective utilization of information resources corresponding to a shared wireless access point is improved as a whole, so that when a user sends a use request for a target wireless access point, sharing mode information corresponding to the target wireless access point is accepted, and the sharing mode information satisfies use requirements and use preferences of different users by means of effective classification of the wireless access points massively stored in the network device 1, thereby enriching the user's selection types and optimizing the user experience. Here, the user equipment 2 implements the acquisition of access information of the shared wireless access point more efficiently in cooperation with the network device 1 by sending the use request to the network device 1 and obtaining corresponding data information returned by the network device 1.

Figure 5:
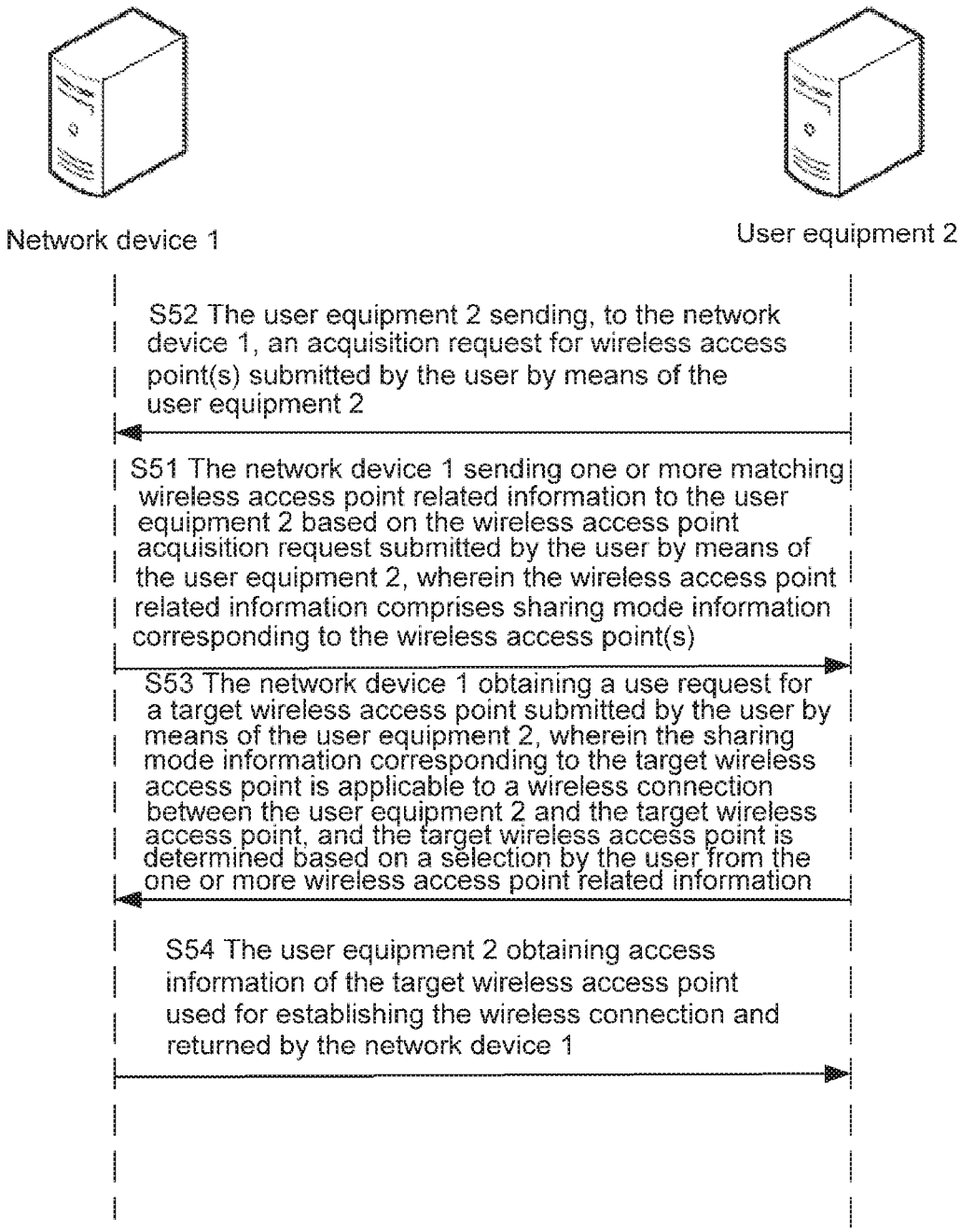
FIG. 5 shows a flowchart of a method for sharing a wireless access point at a network device end and a user equipment end according to one embodiment of the present application.

FIG. 5 shows a flowchart of a method for sharing a wireless access point at a network device end and a user equipment end according to one embodiment of the present application. The method comprises steps S52, S51, S53 and S54. The contents of steps S53 and S54 are correspondingly the same as or substantially the same as those of steps S41 and S42 shown in FIG. 4, and are hereby incorporated by reference.

In one embodiment, in step S52, the user equipment 2 sends, to the network device 1, an acquisition request for wireless access point(s) submitted by the user by means of the user equipment 2; then in step S51, the network device 1 sends one or more matching wireless access point related information to the user equipment 2 based on the acquisition request for wireless access point(s) submitted by the user by means of the user equipment 2, and the wireless access point related information comprises sharing mode information corresponding to the wireless access point(s); then in step S53, the network device 1 obtains a use request for a target wireless access point submitted by the user by means of the user equipment 2, and the sharing mode information corresponding to the target wireless access point is applicable to a wireless connection between the user equipment 2 and the target wireless access point, and the target wireless access point is selected and determined by the user from the one or more wireless access point related information; and then in step S54, the user equipment 2 sends, based on the use request, access information of the target wireless access point, which is used for establishing the wireless connection, to the user equipment 2.

In the present application, access point related information of a wireless access point stored in the network device 1 may include one or more of various types of information associated with the wireless access point, for example, the information may include access information of the wireless access point, and the access information comprises verification information for connecting a corresponding wireless access point, for example, a character string and an encrypted character string including connection password information, or description file information including the connection password information; for another example, the information may include SSID (Service Set Identifier) information of the wireless access point, MAC (Media Access Control) information of the wireless access point device, and geographical position information of the wireless access point, for example, latitude and longitude information corresponding to the wireless access point obtained based on GPS (Global Positioning System); for another example, the information may include POI (Point of Interest) information of the wireless access point, such as information of merchants around the wireless access point; for another example, the information may include signal security information, signal strength information, recommended application type information of the wireless access point, etc.; for another example, the information may include sharing mode information of the wireless access point; and for another example, in a payment mode, the information may also include charging mode information. Here, it should understand that the above-mentioned various wireless access point related information are merely exemplary, and the other existing or other types of wireless access point related information that may appear in the future should also be included in the scope of protection of the present application as applicable to the present application and are hereby incorporated by reference.

Here, there may be multiple possible scenarios where the user equipment 2 submits the acquisition request. For example, the user equipment 2 may send its own geographical position information, such as GPS information, to the network device 1, and then the network device 1 determines one or more wireless access points matching the geographical position information and sends wireless access point related information corresponding to the wireless access point to the user equipment 2. For another example, the user equipment 2 obtains one or more wireless access points around it by means of wireless scanning and sends the acquisition request according to this, so that the network equipment 1 is expected to return the one or more wireless access point related information matching the wireless access points.

Here, it should understand that the above-mentioned various scenarios where the user equipment 2 submits the acquisition request are merely exemplary, and the other existing or other application scenarios that may appear in the future should also be included in the scope of protection of the present application as applicable to the present application and are hereby incorporated by reference.

Then, the network device 1 obtains a use request for a target wireless access point submitted by the user equipment 2, and sharing mode information corresponding to the target wireless access point is applicable to a wireless connection between the user equipment 2 and the target wireless access point, and the target wireless access point is selected and determined by the user from the one or more wireless access point related information. Here, the user can refer to the one or more wireless access point related information returned by the network device 1 to determine a target wireless access point complying with the requirements, so as to firstly submit the corresponding use request to the network device 1.

In this embodiment, the network device 1 returns one or more matching wireless access point related information to the user equipment 2 based on the acquisition request for wireless access point(s) submitted by the user equipment 2, which comprises returning matching sharing mode information of the wireless access point. Here, the network device 1 accurately locks a requirement range of the user equipment 2 based on the acquisition request in conjunction with big data operational analysis of the network device 1 to match one or more suitable wireless access point related information for same, so that while the user needs are satisfied, the selection time-consuming of the user equipment 2 is reduced and the data transmission amount among devices is reduced, and at the same time, the user's usage expectations can be better satisfied and the user's networking experience can be optimized.

In one embodiment, step S51 comprises steps S511 (not shown) and S512 (not shown). In step S511, the network device 1 determines one or more matching wireless access point related information based on an acquisition request for wireless access point(s) submitted by a user by means of a user equipment 2, and the wireless access point related information is determined based on a priority determination rule; and in step S512, the network device 1 sends the one or more wireless access point related information to the user equipment 2, and the wireless access point related information comprises sharing mode information corresponding to the wireless access point(s).

In one embodiment, the wireless access point stored in the network device 1 sometimes may correspond to multiple versions of wireless access point related information. For example, it may be the same wireless access point shared by different provision devices, for example, the provision device can be a device corresponding to an owner of the wireless access point, that is, the owner of the wireless access point; and it may be a device used by other people who know the wireless access point related information but do not have an ownership. For another example, the same wireless access point may be shared by the same provision device multiple times. In this scenario, the corresponding version of wireless access point related information most matching the acquisition request (for example, preferentially matching the wireless access point related information, with the highest priority level, corresponding to the same wireless access point) may be determined and provided to the user equipment 2 based on the pre-set priority determination rule.

Here, it may be preferable that the priority determination rule for the multiple versions of access point related information is that the wireless access point related information provided by a provision device with ownership has a priority over the wireless access point related information of the same wireless access point provided by a provision device without ownership; and with regard to multiple provision devices with ownership, wireless access point related information which is temporally subsequent stored is prioritized. Here, the provision device without ownership may be any device that does not have an ownership but knows the wireless access point related information.

Here, when the user equipment 2 desires to obtain wireless access point related information of a target wireless access point stored in the network device 1, a version of wireless access point related information with a higher priority can be matched for the demand device based on the priority determination rule, in order to increase the success rate of the demand device connecting the wireless access point, because in general, the owner of the wireless access point has a right to change the wireless access point related information, the probability that the wireless access point related information provided thereby is valid is higher; and for the wireless access point related information provided by the provision device with the same ownership, the time approximately closes to the present, and the validity of the information is relatively high; and if multiple provision devices with ownership provide the wireless access point related information, it is also preferable to give priority to the temporally subsequent stored information.

In this embodiment, when the network device 1 stores multiple versions of wireless access point related information of the same wireless access point, a version of wireless access point related information with the highest connection success rate can be selected for the user based on the priority determination rule, so that the user's usage expectations can be better satisfied and the user's networking experience can be optimized.

Figure 6:
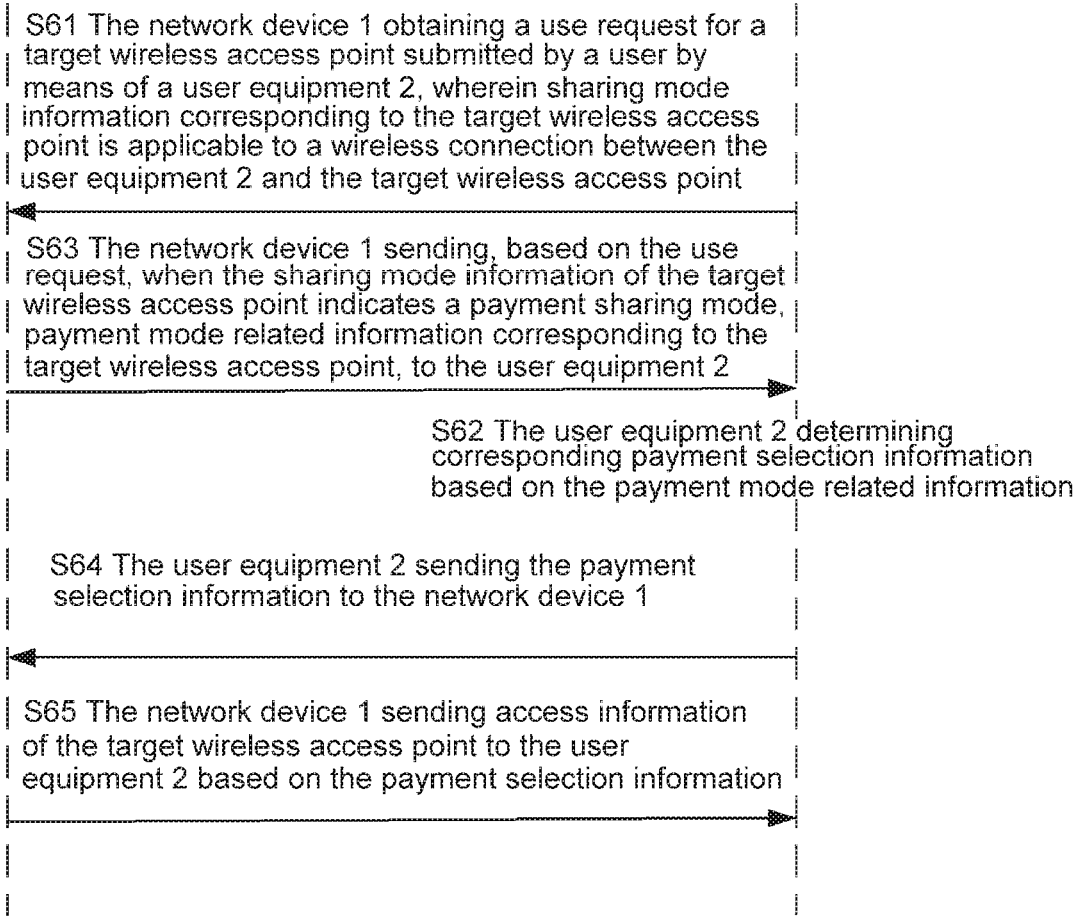
FIG. 6 shows a flowchart of a method for sharing a wireless access point at a network device end and a user equipment end according to another embodiment of the present application.

In one embodiment, step S51 comprises steps S513 (not shown) and S514 (not shown), and in step S513, the network device 1 obtains an acquisition request for wireless access point(s) submitted by a user by means of a user equipment 2, and the acquisition request contains the sharing mode condition; and then in step S514, the network device 1 sends the one or more wireless access point related information of which the sharing mode information match the sharing mode condition to the user equipment 2. Here, when the user equipment 2 submits the acquisition request, that is, simultaneously comprising a sharing mode condition, for example, a payment mode or a free mode, the network device 1 will directly determine the wireless access point related information that meets the sharing mode condition, for example, a user desires to use a free wireless access point, or a user desires to use a payment wireless access point with a higher safety factor. Therefore, based on the sharing mode condition of the user equipment 2, the resource consumption of data query and data transmission in the network device 1 can be reduced, and at the same time, direct user requirements of the user can be more efficiently satisfied, and the user experience can be optimized.

and FIG. 6 shows a flowchart of a method for sharing a wireless access point at a network device end and a user equipment end according to another embodiment of the present application. The method comprises steps S61, S63, S62, S61, S64 and S65.

In one embodiment, in step S61, the network device 1 obtains a use request for a target wireless access point submitted by a user by means of user equipment 2, and sharing mode information corresponding to the target wireless access point is applicable to a wireless connection between the user equipment 2 and the target wireless access point; then in step S63, the network device 1 sends, based on the use request, when the sharing mode information of the target wireless access point indicates a payment sharing mode, payment mode related information corresponding to the target wireless access point to the user equipment 2; then in step S62, the user equipment 2 determines corresponding payment selection information based on the payment mode related information; furthermore, in step S64, the user equipment 2 sends the payment selection information to the network device 1; and then the network device 1 sends access information of the target wireless access point to the user equipment 2 based on the payment selection information. Here, the content of step S61 is correspondingly the same as or substantially the same as that of step S41 shown in FIG. 4, which will not be described in detail herein and is hereby incorporated by reference. In this embodiment, for the payment sharing mode, and when the use request does not contain the user's corresponding payment selection information, the user equipment being connected to the target wireless access point requires the user to firstly select a corresponding payment mode, that is, the payment selection information corresponding to the payment mode related information, and then the network device returns the corresponding access information.

Here, it may be preferable that the payment mode related information comprises charging mode information of the target wireless access point, and the charging mode information may be flexibly selected, combined and set according to the standards such as a connection duration and the number of times of connections of the wireless access point. The charging mode information may be set by a wireless access point provider or the network device 1 when the wireless access point is shared, and the payment mode information is information of the current wireless access point. Further, the payment mode related information further comprises historical charging information of the target access point. Here, the network device 1 may perform statistical analysis on the historical charging information within a pre-set period of time and provide the statistical analysis result as historical charging information to the user equipment 2, so that the user equipment can better determine and select a target wireless access point and submit corresponding payment selection information.

In this embodiment, the network device 1 can also firstly send, if the sharing mode information indicates a payment sharing mode, corresponding payment mode related information to the corresponding user equipment 2 based on the obtained user request, and then sends, after the corresponding payment selection information returned by the user equipment 2, access information of the target wireless access point. Here, the payment mode related information will give the user equipment 2 a more flexible and diverse selection range, which can make it convenient for the users to select a specific matching payment mode based on their actual networking requirements, thereby optimizing the user experience. At the same time, by means of the diversified payment modes, the providers of the target wireless access point are encouraged to share their own wireless access point as a whole, thereby enriching the users' selectable shared wireless access points and more efficiently satisfying the user's networking requirements.

In one embodiment (see FIG. 4), the network device 1 further comprises steps S43 (not shown) and S45 (not shown). In step S43, the network device 1 obtains update information for the wireless access point related information of the target wireless access point, and the update information comprises update information for access information of the target wireless access point, and/or update information for the charging mode information of the target wireless access point; and in step S45, the network device 1 updates, based on the update information, the wireless access point related information of the target wireless access point in the network device 1 or matches update marks.

In one embodiment, the update information herein may comprise the updated specific data of the access point related information, or may also be merely change prompt information indicating that the wireless access point related information is updated. Here, it may be preferable that the update information may be obtained by the network device 1 from the provision device of the shared wireless access point. In addition, it can also be that the update information is firstly provided by the provision device to be stored to a third-party temporary database, a data cache means, etc., and then is obtained by the network device from the temporary database and data cache means. Here, the following several application scenarios can be included In one embodiment: it can be that the network device 1 periodically obtains the update information, and the update information comprises the updated specific data of the wireless access point related information, so that the network device 1 performs data update on the stored wireless access point related information based on the update information; it can also be that the network device 1 obtains the update information in real time, and the update information comprises the updated specific data of the wireless access point related information, so that the network device 1 performs data update on the stored wireless access point related information based on the update information; it can also be that the network device 1 obtains the update information in real time, and the update information corresponds to the change prompt information indicating that the wireless access point related information is updated, so that the network device 1 only matches, based on the update information, the stored wireless access point related information with update marks, and in this scenario, when the user requests the wireless access point related information, the actually updated specific data is found in the provision device or the temporary database and the data cache means again based on the heading of the update marks, such that the resource consumption of data transmission and data storage in the network device 1 can be reduced as a whole while ensuring the validity of the wireless access point related information obtained by the demand users. Here, it should understand that the above-mentioned various application scenarios of this embodiment are merely exemplary, and the other existing or other various application scenarios that may appear in the future should also be included in the scope of protection of the present application as applicable to the present application and are hereby incorporated by reference.

Here, the wireless access point related information comprises one or both of the access information and the charging mode information. And the update information matches the provision device, such as matching the provision device identification information. Here, it should understand that the above-mentioned access information and charging mode information are merely exemplary, and the other existing or other various types of wireless access point related information that may appear in the future should also be included in the scope of protection of the present application as applicable to the present application and are hereby incorporated by reference.

In this embodiment, the network device 11 obtains update information for the wireless access point related information, and the update information comprises update information for the access information of the wireless access point, and/or update information for the charging mode information of the wireless access point, and updates, based on the update information for the wireless access point, the stored wireless access point related information or matches update marks. Here, multiple update modes can be flexibly selected based on the impact and demand of data update on the overall running efficiency, for example, updating specific data, such as access information, or/and charging mode information of the stored wireless access point based on the update information for the wireless access point related information; and for another example, setting an update mark first, and then performing an oriented data update based on the subsequent requirements, such as based on the use request from the user equipment 2, in conjunction with an indication of the update mark. Therefore, the resource consumption of data transmission and data storage in the network device 11 can be reduced as a whole while ensuring the validity of the wireless access point related information obtained by the user equipment 2.

In one embodiment, the method further comprises step S47 (not shown), and in step S47, the network device 1 determines, based on the use request for the target wireless access point of the user equipment 2, current charging mode information of the target wireless access point based on an update mark with the charging mode information if the target wireless access point corresponds to the update mark, and the current charging mode information is to be sent to the user equipment 2 corresponding to the use request. Here, in order to reduce the consumption of time and storage resources caused by data update in the network device, an update mark can be made to the charging mode information that sends changes in place of the network device to update the stored charging mode information in real time, so that when the use request from the user equipment 2 arrives, the status of the locally stored charging mode information is first queried, if there is no corresponding update mark, the locally stored charging mode information in the network device 1 is presumptive current charging mode information, and if the locally stored charging mode information corresponds to an update mark, the updated actual data information is read, based on the indication of the update mark, from the provision device updating a source or other temporary databases or third party databases to serve as the current charging mode information and is sent to the user equipment 2.

In one embodiment, the method further comprises steps S44 (not shown), S46 (not shown) and S48 (not shown).

In step S44, the user equipment 2 establishes a wireless connection between the user equipment 2 and the target wireless access point based on access information of the target wireless access point; then in step S46, the user equipment 2 obtains prompt information corresponding to update information for the charging mode information of the target wireless access point and sent by the network device; and furthermore, in step S48, the user equipment 2 reconfirms, based on the prompt information, the target wireless access point to be connected. Here, when the provision device changes the charging mode information, the network device generates corresponding prompt information based on the update information, and the prompt information may comprise the change of the charging mode information of the target wireless access point that the user equipment 2 is using, and if the charging fee becomes higher, other applicable alternative wireless access point related information may also be recommended to the user for sending, so that the user equipment 2 can reasonably adjust its own connection strategy based on the prompt information. For example, the target wireless access point, is changed or the usage duration is adjusted, etc. Therefore, the user experience is optimized.

In one embodiment, the method further comprises step S49 (not shown), and in step S49, the network device 1 sends, based on the use request, when the sharing mode information of the target wireless access point indicates a payment sharing mode, payment prompt information to the user equipment 2 in conjunction with the charging mode information of the target wireless access point and use-related information of the target wireless access point by the user equipment 2. Here, the use-related information may be from the payment selection information determined by the user equipment 2 based on the charging mode information, such as a pre-selected connection duration, the number of times of connections, etc., and may also be from the actual use of the target wireless access point by the user, that is, the real-time statistical use. Here, the use-related information may be captured by the network device 1 directly from the user equipment 2, and may also be sent by the user equipment 2 to the network device 1 based on settings, such as periodically. Here, the payment prompt information sent to the user equipment 2 may be sent at any time before, during, or after the user actually uses the target wireless access point.

It is apparent that the present application is not limited to the details of the above-mentioned exemplary embodiments, and the present application can be implemented in other specific forms without departing from the spirit or basic features of the present application. Therefore, no matter from which point of view, the embodiments should all be regarded as exemplary and non-limiting. The scope of the present application is defined by the appended claims rather than the above-mentioned description, and therefore it is intended that all changes which fall within the meaning and range of equivalency of the claims are embraced in the present application. Any reference signs in the claims should not be construed as limiting the claims involved. In addition, it is apparent that the word "comprising" does not exclude other elements or steps, and the singular does not exclude the plural. Units or means stated in the device claims may also be implemented by one unit or means by means of software or hardware. The terms first and second and the like are used to represent names and do not represent any particular order.

What is claimed is:

1. A method for obtaining access information of a shared wireless access point at a network device end, comprising:
   obtaining an acquisition request for a wireless access point submitted by a user by means of a user equipment;
   sending, based on the acquisition request, wireless access point related information of one or more matching wireless access points to the user equipment, wherein the wireless access point related information comprises sharing mode information of a wireless access point and the sharing mode information of a wireless access point indicates whether the wireless access point is shared for free or is shared with payment;
   obtaining a use request for a target wireless access point submitted by the user by means of the user equipment, wherein the target wireless access point is determined and selected from the one or more matching wireless access points by the user based on the sharing mode information;
   updating access information of the target wireless access point based on the use request for the target wireless access point and the presence of an update mark of the target wireless access point; and
   sending, based on the use request, updated access information of the target wireless access point, which is used for establishing the wireless connection, to the user equipment, wherein the access information of the target wireless access point includes verification information for connecting the target wireless access point.

2. The method according to claim 1, wherein the step of sending the wireless access point related information of one or more matching wireless access points to the user equipment comprises:
   determining wireless access point related information of the one or more matching wireless access points based on the acquisition request for the wireless access point(s) submitted by the user by means of the user equipment, wherein the wireless access point related information is determined based on a priority determination rule; and sending the wireless access point related information of the one or more matching wireless access points to the user equipment.

3. The method according to claim 2, wherein the priority determination rule comprises:

the wireless access point related information provided by a provision device with an ownership having a priority over wireless access point related information of the same wireless access point provided by a provision device without an ownership; and/or with regard to different versions of wireless access point related information of the same wireless access point provided by multiple provision devices with ownership, wireless access point related information which is temporally subsequent stored is prioritized.

4. The method according to claim 3, further comprising:

obtaining update information for the wireless access point related information of the target wireless access point, wherein the update information comprises update information for the access information of the target wireless access point, and/or update information for the charging mode information of the target wireless access point, and the update information matches the provision device; and updating, based on the update information, the wireless access point related information of the target wireless access point in the network device or matching update marks.

5. The method according to claim 4, further comprising:

based on the use request for the target wireless access point by the user equipment, when the target wireless access point corresponds to an update mark with the charging mode information, determining current charging mode information of the target wireless access point based on the update mark, wherein the current charging mode information is to be sent to the user equipment corresponding to the use request.

6. The method according to claim 4, further comprising:

sending prompt information to the user equipment based on the update information for the charging mode information when the update information is update information for the charging mode information of the target wireless access point and the target wireless access point is being used by the user equipment.

7. The method according to claim 1, wherein the step of sending the wireless access point related information of one or more matching wireless access points to the user equipment comprises:

obtaining the acquisition request for wireless access point(s) submitted by the user by means of user equipment, wherein the acquisition request comprises a sharing mode condition; and sending the wireless access point related information of one or more matching wireless access points of which the sharing mode information match the sharing mode condition to the user equipment.

8. The method according to claim 1, wherein the step of sending the access information of the target wireless access point to the user equipment comprises:

sending, based on the use request, when the sharing mode information of the target wireless access point indicates a payment sharing mode, payment mode related information corresponding to the target wireless access point to the user equipment;

obtaining payment selection information which is sent by the user equipment and based on the payment mode related information; and sending, based on the payment selection information, the access information of the target wireless access point to the user equipment.

9. The method according to claim 8, wherein the payment mode related information comprises charging mode information of the target wireless access point.

10. The method according to claim 9, wherein the payment mode related information further comprises historical charging information of the target access point.

11. The method according to claim 1, further comprising:

sending, based on the use request, when the sharing mode information of the target wireless access point indicates a payment sharing mode, payment prompt information to the user equipment based on the charging mode information of the target wireless access point and use-related information of the target wireless access point by the user equipment.

12. A method for obtaining access information of a shared wireless access point at a user equipment end, comprising:

sending, to a network device, an acquisition request for a wireless access point submitted by a user;

receiving wireless access point related information of one or more matching wireless access points from the network device, wherein the wireless access point related information comprises sharing mode information of a wireless access point and the sharing mode information of a wireless access point indicates whether the wireless access point is shared for free or is shared with payment;

sending, to the network device, a use request for a target wireless access point submitted by a user, wherein the target wireless access point is determined and selected from the one or more matching wireless access points by the user based on the sharing mode information; and obtaining updated access information of the target wireless access point, which is used for establishing the wireless connection and returned by the network device, wherein the access information of the target wireless access point is updated based on the use request for the target wireless access point and the presence of an update mark of the target wireless access point and wherein the access information of the target wireless access point includes verification information for connecting the target wireless access point.

13. The method according to claim 12, wherein when the acquisition request contains a sharing mode condition, and the step of receiving the wireless access point related information of one or more matching wireless access points from the network device comprises:

receiving the wireless access point related information of one or more wireless access points matching the sharing mode condition from the network device.

14. The method according to claim 12, wherein the step of obtaining the access information of the target wireless access point comprises:

obtaining, based on the use request, when the sharing mode information indicates a payment sharing mode, payment mode related information of the target wireless access point returned by the network device, wherein the payment mode related information comprises charging mode information;

determining corresponding payment selection information based on the payment mode related information;

sending the payment selection information to the network device; and obtaining access information of the target wireless access point corresponding to the payment selection information and returned by the network device.

15. The method according to claim 12, further comprising:

establishing, based on the access information of the target wireless access point, the wireless connection between the user equipment and the target wireless access point;

obtaining prompt information corresponding to update information for the charging mode information of the target wireless access point and sent by the network device; and reconfirming, based on the prompt information, the target wireless access point to be connected.

16. A system for obtaining access information of a shared wireless access point, comprising a network device and a user equipment, wherein the network device comprises:

first means for obtaining an acquisition request for a wireless access point submitted by a user by means of a user equipment;

third means for sending, based on the acquisition request, wireless access point related information of one or more matching wireless access points to the user equipment, wherein the wireless access point related information comprises sharing mode information of a wireless access point and the sharing mode information of a wireless access point indicates whether the wireless access point is shared for free or is shared with payment;

the first means for obtaining a use request for a target wireless access point submitted by the user by means of the user equipment, wherein the target wireless access point is determined and selected from the one or more matching wireless access points by the user based on the sharing mode information;

fourth means for updating access information of the target wireless access point based on the use request for the target wireless access point and the presence of an update mark of the target wireless access point; and second means for sending, based on the use request, updated access information of the target wireless access point, which is used for establishing the wireless connection, to the user equipment, wherein the access information of the target wireless access point includes verification information for connecting the target wireless access point;

wherein the user equipment comprises:

eleventh means for sending, to a network device, an acquisition request for a wireless access point submitted by a user;

twelfth means for receiving wireless access point related information of one or more matching wireless access points from the network device, wherein the wireless access point related information comprises sharing mode information of a wireless access point and the sharing mode information of a wireless access point indicates whether the wireless access point is shared for free or is shared with payment;

ninth means for sending, to the network device, a use request for a target wireless access point submitted by a user, wherein the target wireless access point is determined and selected from the one or more matching wireless access points by the user based on the sharing mode information; and tenth means for obtaining updated access information of the target wireless access point, which is used for establishing the wireless connection and returned by the network device.

\* \* \* \* \*